Feb. 6, 1934.  J. McLINTOCK  1,946,409
BEARING OF AXLES AND SHAFTS
Filed Sept. 9, 1930
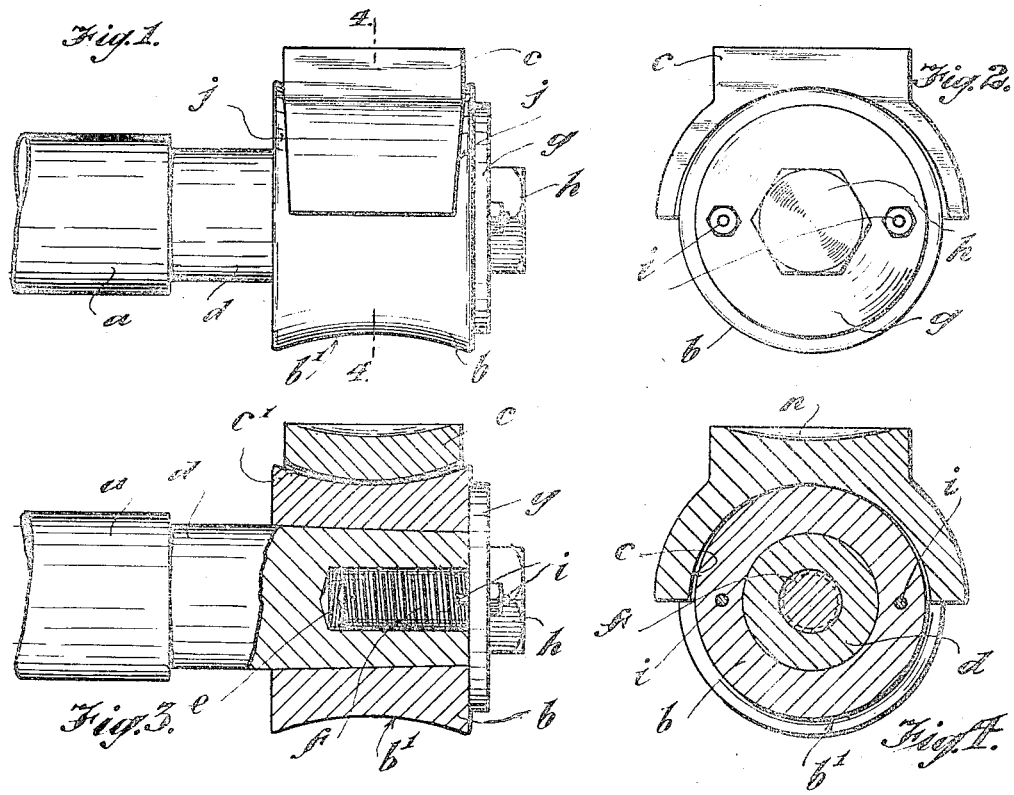
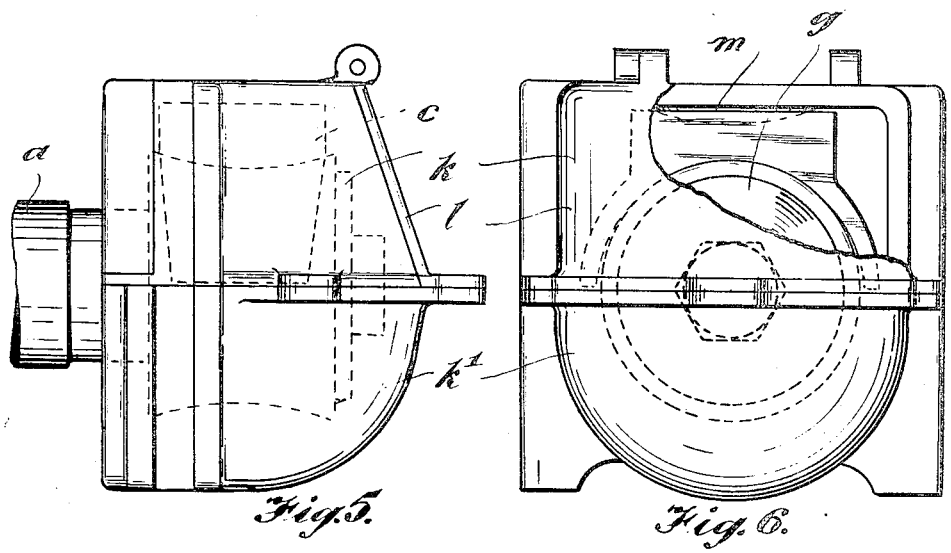
Inventor:—
John McLintock
by his Attorneys
Howson & Howson

UNITED STATES PATENT OFFICE 1,946,409

BEARING OF AXLES AND SHAFTS

John McLintock, Dennistoun, Glasgow, Scotland

Application September 9, 1930, Serial No. 480,799½, and in Great Britain September 9, 1929

5 Claims. (Cl. 308—40)

This invention has reference to the bearings of axles and shafts and is of particular utility as applied to the axles of railway wagons, locomotives and the like but its application is not restricted to such purposes.

My invention has for its object to provide an improved bearing which will be capable of a self-aligning or self-adjusting movement.

On the annexed sheet of drawing I have illustrated, by way of example, a preferred embodiment of my invention and whereon:

Figure 1 illustrates an elevation of the end of an axle of a railway wagon or the like with the improved bearing applied thereto.

Figure 2 is an end view of Figure 1.

Figure 3 is a sectional elevation of the bearing applied to an axle, and Figure 4 is a section on the line 4—4 Figure 1.

Figure 5 illustrates the end of the axle with bearing indicated in dotted lines and enclosed within a grease box, and Figure 6 is an end elevation of Figure 5, the lid of the box being shown partly broken away.

Referring to the drawing: $a$ is the axle, $b$ the bearing wheel or collar and $c$ the upper bearing.

The end of the axle is reduced and slightly tapered as at $d$ and the bearing wheel $b$, which has a slightly tapered bore, is tightly fitted and preferably keyed thereon. The tapered end is bored centrally and internally screw threaded as at $e$ to receive a screw threaded pin $f$ formed integral with a flange $g$ the outer face of which is formed with a nut like projection $h$ by which the pin can be screwed within the end of the axle until the flange bears tightly on the hub $b$ to prevent end movement thereof.

Bolts $i$ extending through the bearing wheel $b$ and flange $g$ prevent the latter working loose.

The periphery $b^1$ of the bearing wheel $b$ is concave in cross section as shown clearly in Figures 1 and 3.

The half bearing $c$ which partly encloses the bearing wheel is of convex formation on its bearing face $c^1$ to correspond with the periphery of the bearing wheel.

Heretofore in axle bearings the upper bearings have been relatively long in an axial direction and short in a circumferential direction. As distinct from such half bearing it will be noted that said bearing, in accordance with my invention, extends substantially half way round the bearing wheel and is relatively short in an axial direction.

The two sides $j$ $j$ of the upper bearing are not parallel to each other, but are such that the width of the bearing face of said upper half bearing decreases towards the extremities of the arc of said bearing to permit the bearing to partake of a slight rocking movement relative to the axle and in a vertical plane at right angles to that in which the bearing wheel rotates. In order to reduce the friction of such movement and as indicated in Figure 3, the convex surface of the upper bearing does not exactly correspond to the concave periphery of the bearing wheel, the radius of the concavity being slightly less than that of the convexity.

It will be further noted that the radius of the bearing wheel is just slightly less than that of the upper bearing.

The bearing is enclosed within any suitable grease box. In the drawing the box is shown as formed of two parts $k$ $k^1$ bolted or otherwise secured together.

The upper part, which is provided with a lid $l$ for the introduction of lubricant, is provided on the roof thereof with a shallow dome shape protuberance $m$ which fits within a corresponding cavity $n$ in the upper bearing. Thus while the grease box takes the upward thrust of the upper bearing it permits the latter to partake of a restricted rocking movement.

In use, should for any reason the bearing be defective, either the upper bearing or the bearing wheel or both may be speedily removed and replaced.

Thus, in the case of railway wagons wherein the axles have become corded it has been necessary to return the wagon to the workshop to have the bearings overhauled whereas the bearings in accordance with my invention may be renewed in situ. That is, it is merely necessary to jack up the wagon, remove the bearing wheel or upper bearing or both and fit on a new bearing wheel, upper bearing or both as the case may be. Such parts may be standardized so that such operation can be quickly effected.

Further the bearing is self adjusting, that is the upper bearing can partake of a slight transverse rocking movement with respect to the bearing wheel, this being of particular importance when the wagon is rounding curves.

By the use of the improved bearing and a suitable grease box either solid or liquid or a more or less viscous lubricant or grease can be used therein.

What I claim is:—

1. An axle bearing comprising a collar fast on the axle, the periphery of the collar being concave in cross section and an upper half bearing of substantially semi-circular formation and having a convex bearing face, the radius of the concavity of the periphery of the collar being slightly greater than that of the convexity of the upper half bearing.

2. An axle bearing comprising a collar fast on the axle, the periphery of said collar being concave in cross section and an upper half bearing of substantially semi-circular formation and having a bearing face of convex cross section so as to conform to and register with the periphery of the collar, the radius of the collar wheel being slightly less than that of the upper half bearing.

3. An axle bearing comprising a collar fast on the axle, the periphery of the collar being concave in cross section, and an upper half bearing of substantially semi-circular formation and having a bearing face of convex cross section so as to substantially register with the periphery of the collar, the width of the bearing surface of said upper half bearing decreasing towards the extremities of the arc of said bearing so as to permit of a slight rocking movement.

4. An axle shaft bearing comprising a collar fast on the axle, said collar having a concave bearing face, an upper half bearing of substantially semi-circular formation and having a bearing face of convex cross section so as to conform to and register with the bearing face of the collar, and a box enclosing said bearing, the upper half bearing and the face of box against which it abuts having an interfitting dome-like projection and corresponding recess.

5. An axle shaft bearing comprising a collar fast on the axle, said collar having a concave bearing face, an upper half bearing of substantially semi-circular formation and having a bearing face of convex cross section so as to conform to and register with the bearing face of the collar, the radius of the concavity of the periphery of the collar being slightly greater than that of the convexity of the upper half bearing and the radius of the collar being slightly less than that of the upper half bearing.

JOHN McLINTOCK.